United States Patent
Sundaresan (10) Patent No.: US 12,088,719 B2
(45) Date of Patent: Sep. 10, 2024

(54) METHOD AND SYSTEM FOR INCREMENTAL TRAINING OF MACHINE LEARNING MODELS ON EDGE DEVICES

(71) Applicant: swarmin.ai, Fremont, CA (US)

(72) Inventor: Subash Sundaresan, Fremont, CA (US)

(73) Assignee: Subash Sundaresan, Fremont, CA (US)

( * ) Notice: Subject to any disclaimer, the term of this patent is extended or adjusted under 35 U.S.C. 154(b) by 977 days.

(21) Appl. No.: 17/092,289

(22) Filed: Nov. 8, 2020

(65) Prior Publication Data

US 2021/0232981 A1 Jul. 29, 2021

Related U.S. Application Data

(60) Provisional application No. 62/965,099, filed on Jan. 23, 2020.

(51) Int. Cl.
*H04L 9/32* (2006.01)
*G06F 21/57* (2013.01)
(Continued)

(52) U.S. Cl.
CPC ............ *H04L 9/3213* (2013.01); *G06F 21/57* (2013.01); *G06N 20/00* (2019.01); *G06N 20/20* (2019.01);
(Continued)

(58) Field of Classification Search
CPC .... G06F 16/182; G06F 21/57; G06F 18/2148; H04L 9/213; H04L 9/32; H04L 63/08; H04L 67/1093; H04L 2209/805; H04L 2209/84; H04L 63/061; H04L 63/0823; H04L 67/10; H04L 67/104; H04L 67/12;
(Continued)

(56) References Cited

U.S. PATENT DOCUMENTS 9,524,472 B2 * 12/2016 Newnham ............... G06N 20/00
10,769,549 B2 * 9/2020 Bonawitz ............... G06N 3/098
(Continued)

OTHER PUBLICATIONS

Vanhaesebrouck et al. "Decentralized Collaborative Learning of Personalized Models over Networks", 2017, arXiv:1610.05202v2 (Year:2017).*

(Continued)

*Primary Examiner* — Brent Johnston Hoover (57) ABSTRACT

A method and system for incremental training of machine learning (ML) models on edge devices, is disclosed. A base version of ML model is received by a first device of the peer to peer network of devices. The base version of the ML model is incremental trained in real-time by updating weights associated with the parameters of the ML model during a predetermined window of time. The ML model are devoid of an underlying event data used to generate the incremental version of the ML model. The updated weights associated with parameters of the incrementally trained ML model and/or the respective parameters are shared by each edge device with other edge devices. The edge devices update their respective ML models based on the received updated weights and/or parameters upon subsequent events at the edge devices and the updated version of the ML models are further incrementally trained.

16 Claims, 8 Drawing Sheets

(51) Int. Cl.
*G06N 20/00* (2019.01)
*G06N 20/20* (2019.01)
*H04L 9/40* (2022.01)
*G06N 3/098* (2023.01)

(52) U.S. Cl.
CPC ............... *H04L 9/32* (2013.01); *H04L 63/08* (2013.01); *G06N 3/098* (2023.01)

(58) Field of Classification Search
CPC ...... H04L 9/3213; G06N 3/098; G06N 20/00; G06N 20/20
See application file for complete search history.

(56) References Cited

U.S. PATENT DOCUMENTS

| | | | |
|---|---|---|---|
| 2019/0050749 A1* | 2/2019 | Sanketi | G06F 9/44505 |
| 2019/0158482 A1* | 5/2019 | Wang | H04W 12/33 |
| 2020/0050951 A1* | 2/2020 | Wang | G06N 20/00 |
| 2020/0112609 A1* | 4/2020 | Hardman, III | H04L 45/22 |
| 2020/0293887 A1* | 9/2020 | De Brouwer | G16H 50/20 |
| 2021/0097430 A1* | 4/2021 | Das | G06N 20/00 |

OTHER PUBLICATIONS

Roy et al. "Brain Torrent: A Peer-to-Peer Environment for Decentralized Federated Learning", 2019, arXiv:1905.06731v1 (Year: 2019).*

* cited by examiner

METHOD AND SYSTEM FOR INCREMENTAL TRAINING OF MACHINE LEARNING MODELS ON EDGE DEVICES

CROSS-REFERENCE TO RELATED APPLICATIONS

This patent application claims priority to U.S. provisional patent application No. 62/965,099 filed on Jan. 23, 2020, and is related to U.S. provisional patent application No. 62/972,580 filed on Feb. 10, 2020, U.S. provisional patent application No. 62/972,590 filed on Feb. 10, 2020, U.S. provisional patent application No. 62/978,277 filed on Feb. 18, 2020, U.S. provisional patent application No. 62/978,280 filed on Feb. 18, 2020. the complete disclosures of which, in their entirety, are hereby incorporated by reference.

BACKGROUND

Technical Field

The embodiments herein generally relate to an architecture for machine learning, and more particularly, to a system and method of incremental training of one or more machine learning models on one or more edge devices in a peer to peer network of devices.

Description of the Related Art

Machine learning techniques are typically used to build a model or rule set to predict a result based on the values of one or more features. Machine learning techniques typically involve use of a data set that includes, for each record, a value for each of a set of features, and a result. A model or rule set for predicting the result is developed based on the data set. Machine learning techniques generally build on statistical underpinnings. Statistical approaches test a proposed model against a set of data. Machine learning techniques search through a space of possible models, to find the best model to fit a given set of data used for various commonly seen use cases such as personalization of user experiences, recommendation of products, medical diagnosis, and the like.

Figure 1:
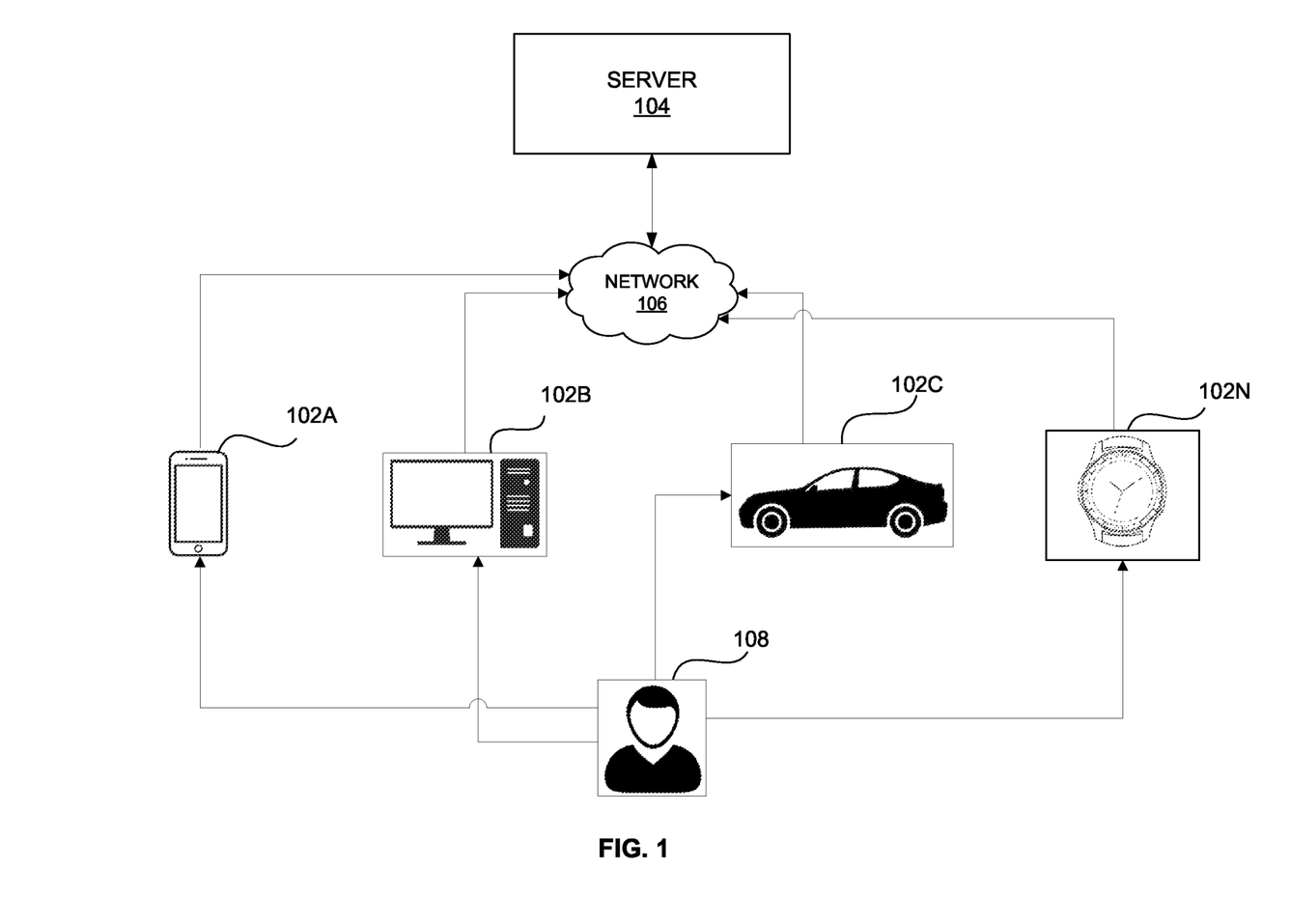
FIG. 1 depicts a network architecture for machine learning on a server.

Typically, machine learning techniques follow a data flow architecture that involves sending data from usage of relevant applications or websites by end users of edge devices to a central server, where the edge devices may include devices such as smartphones, tablets, computers, smart watches, internet of things (IoT) devices, connected vehicles, and the like. The server aggregates all the data gathered from the edge devices and uses the data to train a machine learning (ML) model. The trained ML model is subsequently used for decisioning, such as for example personalization or product recommendations, medical diagnosis and the like. An example of a typical network environment for machine learning is depicted in FIG. 1. Typically, data associated with one or more users 108A-N, including for example, data associated with usage of applications or websites is transferred to a server 104 via a network 106. The server aggregates all the data received and a machine learning (ML) model is trained at the server 104 based on the aggregated data. The trained ML model is subsequently used for decisioning for various technical purposes, such as for example, for personalization of user experience, for providing product recommendations, medical diagnosis, and the like.

However, the above described architecture for training an ML model has several disadvantages. For instance, sending data associated with the users to the server 104 causes privacy and/or security concerns as the data may be shared with and/or used by third parties without the consent of the users. Also, in several exemplary scenarios, data on the server 104 may be hacked by malicious actors, thereby causing data leaks. The data may include sensitive data such as health or financial records, or location data, among many others. Due to the privacy and data security concerns such as those mentioned above, many owners of application and websites may be reluctant to share such valuable data with the server 104, thereby potentially denying the benefits that ML models based on that data can provide to end users, such as, for example, being able to diagnose diseases based on medical data signals. Additionally, ML models generated based on known training techniques typically constitute large file sizes that impose a significant load on the network on being repeatedly transmitted to the server 104. Moreover, traditional techniques of training the ML model known in the art involve slow learning and are not continuous, as the aggregation of data and updating of the training of the ML models is typically done periodically (such as at regular intervals every day).

SUMMARY

In view of the foregoing, an embodiment herein provides a system for performing an incremental training of one or more machine learning (ML) models on a first edge device in real time. The first edge device is communicatively connected to other edge devices in a peer to peer network. The first edge device includes a processor. The processor is configured to (a) implement a base version of a first machine learning (ML) model in the first edge device, wherein the first ML model comprises one or more first parameters and one or more first weights associated with the one or more first parameters; (b) incrementally train the base version of the first ML model in real time, upon occurrence of a first data event, by updating the one or more first weights of the first ML model during a first predetermined window of time; (c) enable a second edge device, in the peer to peer network, to incrementally train a second ML model associated with the second edge device by communicating the one or more first updated weights to the second edge device, wherein the second edge device updates the second ML model based on the one or more first updated weights and incrementally trains the updated second ML model, upon occurrence of a second data event at the second edge device, by updating one or more second weights associated with one or more second parameters of the second ML model during the first predetermined window of time; (d) update the first ML model based on the one or more second updated weights received from the second edge device to obtain an updated version of the first ML model; and (e) incrementally train the updated version of the first ML model, upon occurrence of a subsequent data event, by updating the one or more first weights of the updated version of the first ML model during the first predetermined window of time.

In some embodiments, the processor is configured to perform the steps (c) to (e) repeatedly to incrementally train the first ML model.

In some embodiments, the system includes a certifying node that is communicatively connected with the first edge device to regulate the incremental training of the first ML model. The first edge device is configured to register with the certifying node while joining the peer to peer network.

In some embodiments, the certifying node provides an encrypted key to the first edge device that is used to authenticate any subsequent updates from the first edge device.

In some embodiments, the processor is configured to provide the updated version of the first ML model to the certifying node and the certifying node is configured to certify the updated version of the first ML model.

In some embodiments, the first edge device performs the incremental training on the updated versions of the first ML model that is certified and resubmits a subsequent version of the first ML model to the certifying node for certification.

In some embodiments, the certifying node is configured to benchmark the updated version of the first ML model by matching predictions of the updated version of the first ML model based on the first data event with one or more previously known data event.

In some embodiments, the first edge device is configured to generate the base version of the first ML model using an authorized program.

In some embodiments, the one or more first parameters or the one or more second parameters includes at least one of a gender, an age, a location, a category of a content on a website or an application, and the one or more first weights or the one or more second weights indicates an amount of importance their respective parameters that are given in the decisions made by the ML model.

In some embodiments, each of the first, the second or the subsequent data event comprises data associated with a user input to a particular application. The user input includes a usage of the particular application by a user.

In some embodiments, the first predetermined window of time is configurable and includes one individual event or a short batch of events.

In some embodiments, the base version of the first ML model includes learnings based on data previously seen by other edge devices in the peer to peer network. The learnings are devoid of an underlying data event used to generate an incrementally trained version of the ML model.

In some embodiments, the base version of the first machine learning (ML) model in the first edge device is a previous version of the first machine learning (ML) model. The first edge device generates the base version of the first machine learning (ML) model if no previous version of the ML model is available.

In some embodiments, the first edge device is configured to subsequently share the updated version of the first ML model along with the one or more updated first weights and one or more updated first parameters with other edge devices in the peer to peer network.

In one aspect, a method of performing an incremental training of one or more machine learning (ML) models on a first edge device in real time is provided. The first edge device is communicatively connected to other edge devices in a peer to peer network. The method includes (a) implementing a base version of a first machine learning (ML) model in the first edge device, wherein the first ML model includes one or more first parameters and one or more first weights associated with the one or more first parameters; (b) incrementally training the base version of the first ML model in real time, upon occurrence of a first data event, by updating the one or more first weights of the first ML model during a first predetermined window of time; (c) enabling a second edge device, in the peer to peer network, to incrementally train a second ML model associated with the second edge device by communicating the one or more first updated weights to the second edge device, wherein the second edge device updates the second ML model based on the one or more first updated weights and incrementally trains the updated second ML model, upon occurrence of a second data event at the second edge device, by updating one or more second weights associated with one or more second parameters of the second ML model during the first predetermined window of time; (d) updating the first ML model based on the one or more second updated weights received from the second edge device to obtain an updated version of the first ML model; and (e) incrementally training the updated version of the first ML model, upon occurrence of a subsequent data event, by updating the one or more first weights of the updated version of the first ML model during the first predetermined window of time.

In some embodiments, the method performs the steps of (c) to (e) repeatedly to incrementally train the first ML model.

In another aspect, one or more non-transitory computer readable storage mediums storing instructions, which when executed by a processor, causes to perform a method of an incremental training of one or more machine learning (ML) models on a first edge device in real time is provided. The first edge device is communicatively connected to other edge devices in a peer to peer network. The method includes (a) implementing a base version of a first machine learning (ML) model in the first edge device, wherein the first ML model includes one or more first parameters and one or more first weights associated with the one or more first parameters; (b) incrementally training the base version of the first ML model in real time, upon occurrence of a first data event, by updating the one or more first weights of the first ML model during a first predetermined window of time; (c) enabling a second edge device, in the peer to peer network, to incrementally train a second ML model associated with the second edge device by communicating the one or more first updated weights to the second edge device, wherein the second edge device updates the second ML model based on the one or more first updated weights and incrementally trains the updated second ML model, upon occurrence of a second data event at the second edge device, by updating one or more second weights associated with one or more second parameters of the second ML model during the first predetermined window of time; (d) updating the first ML model based on the one or more second updated weights received from the second edge device to obtain an updated version of the first ML model; and (e) incrementally training the updated version of the first ML model, upon occurrence of a subsequent data event, by updating the one or more first weights of the updated version of the first ML model during the first predetermined window of time.

In some embodiments, the method performs the steps of (c) to (e) repeatedly to incrementally train the first ML model.

In some embodiments, the method comprises providing an encrypted key to the first edge device that is used to authenticate any subsequent updates from the first edge device.

In some embodiments, the method comprises benchmarking the updated version of the first ML model by matching predictions of the updated version of the first ML model based on the first data event with one or more previously known data event.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments disclosed herein provide methods and systems for incremental training of machine learning (ML) models on one or more edge devices in a peer to peer network of devices based on an event data at the edge devices. As used herein the term "ML model" may refer to a mathematical representation of a real-world training process, in which a learning algorithm may be configured to find patterns in a training data such that one or more input parameters correspond to a target and an output of the training process is an ML model that may be subsequently used to make one or more predictions. The term "machine learning process" as used herein may refer to a process that tunes one or more parameters to be simultaneously optimal on a training dataset using one or more machines.

Figure 2A:
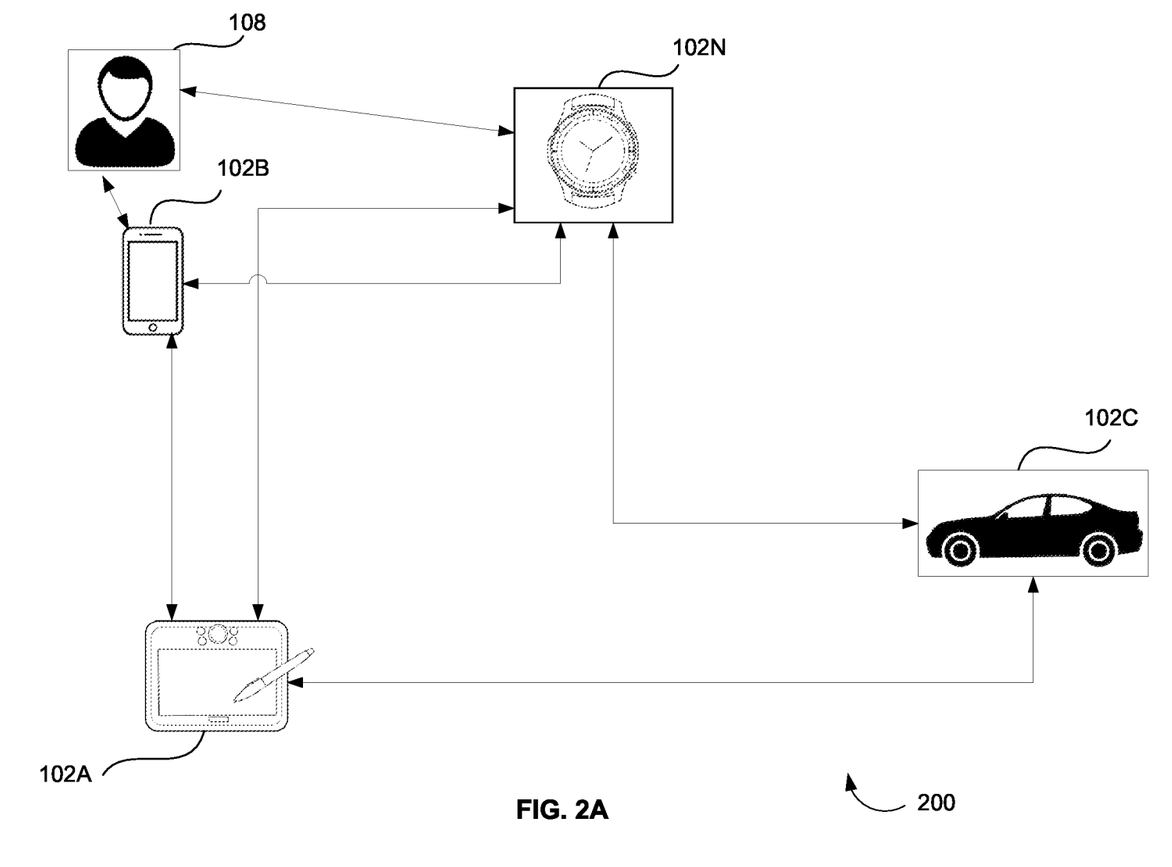
FIG. 2A depicts a block diagram of a peer to peer network of devices configured to perform incremental training of one or more machine learning (ML) models on one or more edge nodes, in accordance with an embodiment.

FIG. 2A depicts a block diagram of a peer to peer network of devices 200 configured to perform incremental training of one or more machine learning (ML) models on one or more edge devices, in accordance with an embodiment. In various embodiments, the peer to peer network of devices 200 may include, a single network or a combination of different networks. Examples of the peer to peer network of devices 200, may include but are not limited to, a local area network (LAN), a wide area network (WAN), a public network, a private network, a proprietary network, a Public Telephone Switched Network (PSTN), the Internet, a wireless network, a virtual network, or any combination thereof. The peer to peer network of devices 200 includes one or more edge devices 102A-N communicatively coupled to one another to enable incremental training of one or more ML models at the one or more edge devices 102A-N. Examples of the edge devices 102A-N includes, but is not limited to, smartphones, tablets, computers, smart watches, IOT devices, connected vehicles, and the like. In several embodiment, edge devices 102A-N may also include various network access points, such as, wired or wireless access points including base stations, internet exchange points or any other type of entity having computation and networking capabilities.

In an embodiment, each of the edge devices 102A-N registered with the peer to peer network of devices 200 may receive a base version of an ML model. In an embodiment, the base version of the ML model may be generated by each of the edge devices 102A-N using an authorized program. In an embodiment, the ML model may include one or more parameters and one or more weights associated with the parameters. Examples of the parameters may include, but are not limited to gender, age, location, the category of the content on the website/app, and the like. The weights indicate an amount of importance the respective parameters are given in the decisions made by the ML model. For example, gender may have a weight of 0.4, while age may have a weight of 0.3. Upon occurrence of a data event at any of the edge devices 102A-N, the base version of the ML model is incrementally trained by the respective edge devices. The data event may include, for example data associated with user inputs to particular applications, such as for example usage of the relevant app/website by the end users (such as user 108).

In an embodiment, each of the edge devices incrementally trains the base version of the ML model upon occurrence of a data event at the respective edge devices. The incremental training is performed by updating one or more weights associated with the one or more parameters of the ML model during a predetermined window of time. The predetermined window of time may include, for example, one individual event or a short batch of events. In an embodiment, the predetermined window of time may be configurable. The incrementally trained ML models may be subsequently used for decisioning, for example for personalization or product recommendations or medical diagnosis. In an embodiment, the updates are applied in real-time on receipt of an event data. The incremental training of the ML models enables machine learning to happen in real-time, as soon as the data event occurs on the edge devices thereby improving the quality of the decisions made by the ML model.

The ML model comprises learnings based on data previously seen by other edge devices in the peer to peer network of devices. In an embodiment, the learnings are devoid of an underlying event data used to generate an incrementally trained version of the ML model. During the incremental training process described herein, a previous version of the ML model may be used as a baseline, or if no such previous version of the ML model is available, then a base version of the ML model may be generated. In various embodiments, the edge devices 102A-N may receive an ML model comprising net learnings based on data previously seen by other edge devices in the peer-peer network of devices 200, but without their underlying event data and such an ML model may constitute the previous, or base version of the ML model on which each edge device incrementally applies one or more training updates based on their respective event data.

The incrementally trained ML models may be used for various purposes, such as for example, sensitive health signals that are available to an application on a wearable device such as, a smart watch may be used to train ML models that may enable prediction of a user's probability of getting a disease, without being concerned about security/privacy issues associated with sending sensitive data to a server.

Figure 2B:
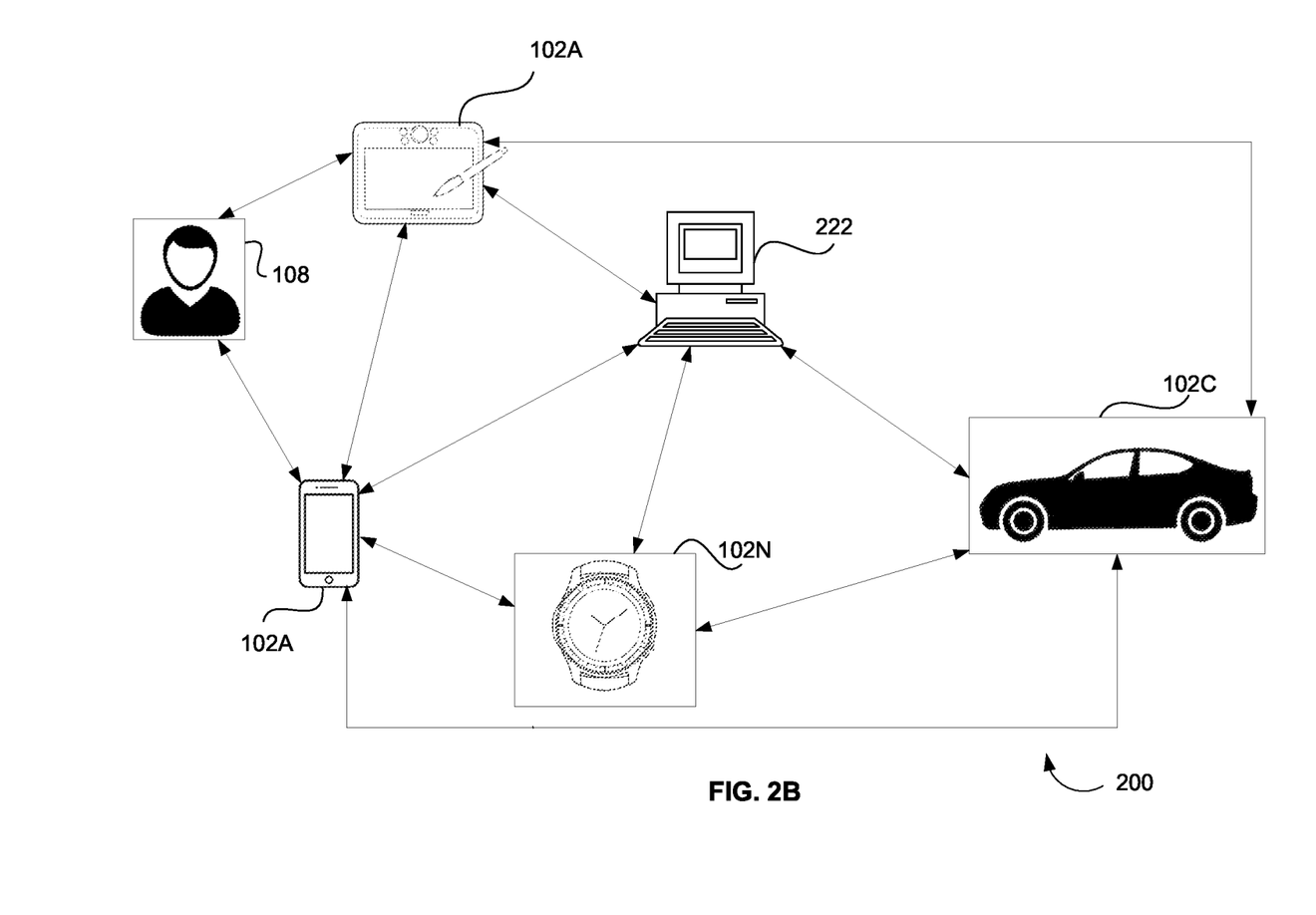
FIG. 2B depicts a block diagram of a peer to peer network of devices configured to perform incremental training of one or more machine learning (ML) models on one or more edge nodes in conjunction with a certifying node, in accordance with another embodiment.

FIG. 2B depicts a block diagram of a peer to peer network of devices including a certifying node 222, in accordance with another embodiment. The certifying node may be communicatively coupled with one or more edge devices 102A-N to regulate the process of incremental training of one or more ML models. In an embodiment, the certifying node may be configured to enable registration of edge devices with the peer to peer network of devices 200, certification of a version of ML model at each of the edge devices 102A-N, prevention of fraud, limiting the rate of training the ML models, and prevention of skew.

In an embodiment, each edge device is configured to register with the certifying node 222 while joining the peer to peer network of devices 200. The certifying node 222 may provide an encrypted key to each edge device that is subsequently used to authenticate any subsequent requests/updates from the respective edge device. In an embodiment, the certifying node 222 is configured to evaluate the legitimacy of the edge devices 102A-N, and if deemed okay, the certifying node 222 issues an encrypted identifier token to the edge devices 102A-N. The encrypted token identifier serves as a proof of authenticity of the edge devices 102A-N and prevents tampering in one or more subsequent interactions with the respective edge devices 102A-N.

In an embodiment, the certifying node 222 uses an encrypted data to verify a base version of the ML model version from which any received updated version of the ML model was derived. In an embodiment, one or more edge devices use the updated certified versions of the ML model to re-apply their incremental training in addition and resubmit the retrained versions to the certifying node 222 for certification.

For instance, if suppose an edge device Ei had previously incrementally trained an ML model version on one or more locally available data points Di1, Di2, upto Din, and had submitted an incremental model version Ei Vj to the certifying node 222, while awaiting a response to the submission from the certifying node 222, the edge device Ei receives a new certified model version, Ek Vl (that originated from another edge device Ek) from the certifying node 222. The edge device Ei retrains on top of the newly received version ML model, and re-applies data points Di1, Di2, upto Din to generate a new incremental version of the ML model Ei Vj+1 to send to the certifying node 222 for certification.

The certifying node 222 benchmarks each update received, in order to make sure that the predictions associated with ML model based on the event data match with one or more previously known metrics and that the predictions are within an acceptable margin of error. In an embodiment, certifying node 222 also measures each incremental model update against a figure of merit such as for example, a root mean square error (RMSE). In an embodiment, the figure of merit must monotonically improve, or remain constant, in order for an update of ML model to be certified by the certifying node 222.

Figure 3A:
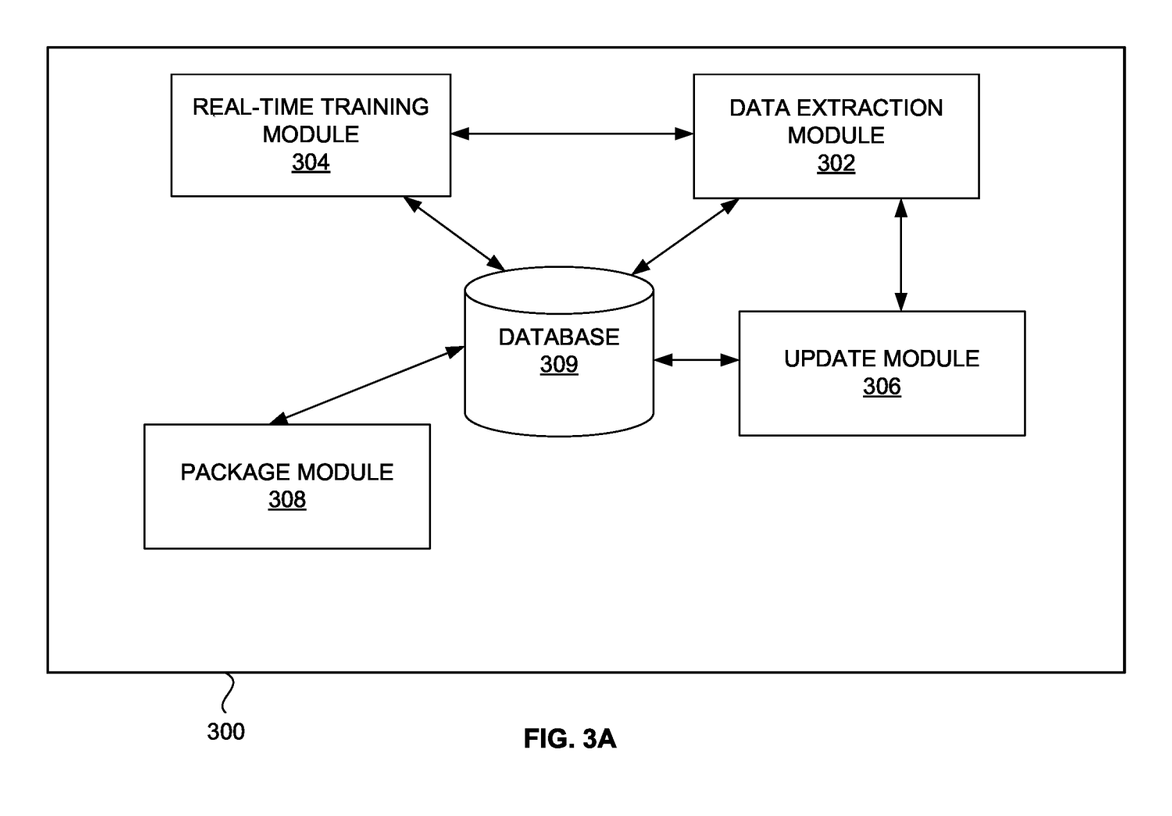
FIG. 3A illustrates a block diagram of an incremental training module associated with one or more edge devices of the peer to peer network of FIGS. 2A and 2B, for enabling incremental training of ML models at the edge devices, in accordance with an embodiment.

FIG. 3A illustrates a block diagram of an incremental training unit 300 associated with one or more edge devices of the peer to peer network of FIGS. 2A-2B, for enabling incremental training of ML models at the edge devices, in accordance with an embodiment. In an embodiment, the incremental training unit 300 is installed in each of the one or edge devices 102A-N associated with the peer to peer network of devices 200. Each of the edge devices 102A-N is configured to receive an ML model comprising learnings based on data previously seen by other edge devices in the peer-peer network of devices 200, such that the learnings are devoid of an underlying event data. As used herein "event data" refers to data associated with a user event associated with the one or more users of the edge devices. In an embodiment, the received ML model forms a base version on which the edge devices 102A-N incrementally apply one or more updates for incremental training of the ML model using the incremental training unit 300.

The incremental training unit 300 enables the one or more edge devices 102A-N to update the training of the model based on an event data generated on the respective one or more edge devices 102A-N during a predetermined window of time. In an embodiment, the predetermined window of time may include, one individual event, or a short batch of events. In an embodiment, the predetermined window of time may be configurable. In an embodiment, the incremental training unit 300 may be enabled to configure the predetermined window of time.

In an embodiment, the incremental training unit 300 is configured to update one or more weights of one or more parameters associated with the event data. Subsequent to updating, each of the edge devices 102A-N shares the updated parameter weights with the rest of the one or more edge devices A-N in the incremental training unit 300, thereby allowing the other edge devices to then further incrementally train their respective ML models using data available on their respective edge devices. The process of training incremental training of the ML model on each edge device, ensures that the data associated with the users 108 remains with the respective edge devices 102A-N without being transmitted to a server or any other device thereby maintaining privacy and security of data associated with each user. In an embodiment, each of edge devices 102A-N are configured to subsequently share the updated ML model along with the updated weights and/or one or more parameters with one or more other edge devices in the peer to peer network 200. It will be appreciated that the network connections shown in FIGS. 2A and 2B are illustrative and other techniques for establishing a communications link between the devices may be used in several embodiments.

FIG. 3A illustrates a block diagram of an incremental training unit 300 associated with one or more edge devices of the peer to peer network of FIGS. 2A and 2B, for enabling incremental training of ML models at the edge devices, in accordance with an embodiment. In an embodiment, the incremental training unit 300 may be implemented in one or more edge devices 102A-N. In an embodiment, the incremental training unit 300 includes one or more of a data extraction module 302, a real-time training module 304, an update module 306, and a package module 308 communicatively associated with a database 309. In various embodiments, the incremental training unit 300 may be implemented as a software development kit (SDK) that may be configured to get associated with one or more applications on the edge devices 102A-N. The data extraction module 302 is operable to generate a base version of the ML model on each of the edge devices 102A-N using an authorized program. In an embodiment, the data extraction module 302 generates the base version of the ML model comprising learnings based on data previously seen by edge devices in the peer to peer network of devices 200 by removing any underlying event data and retaining one or more parameters and one or more weights associated with the parameters. A base version of the ML model may include one or more parameters and one or more weights associated with the parameters. Examples of the parameters may include, but is not limited to gender, age, location, the category of the content on the website/app, and the like. The weights indicate an amount of importance the respective parameters are given in the decisions made by the ML model. For example, gender may have a weight of 0.4, while age may have a weight of 0.3.

In an embodiment, the real-time training module 304 incrementally trains a base version of the ML model at each of the edge devices 102A-N upon occurrence of a data event at the respective edge devices 102A-N. The incremental training is performed by updating one or more weights associated with the one or more parameters of the ML model during a predetermined window of time. The predetermined window of time may include, for example, one individual event or a short batch of events. In an embodiment, the predetermined window of time may be configurable. In an embodiment, the updates are applied in real-time on receipt of an event data. The ML model comprises learnings based on data previously seen by other edge nodes in the network environment. In an embodiment, the learnings are devoid of an underlying event data used to generate the incremental version of the ML model. During the incremental training process described herein, a previous version of the ML model may be used as a baseline, or if no such previous version of the ML model is available, then a base version of the ML model may be generated and/or used.

In an embodiment, the package module 308 is configured to share the updated weights associated with parameters and/or the parameters of the incrementally trained ML model from each edge device to one or more other edge devices in the peer to peer network of devices 200. In an embodiment, the weights and/or the parameters shared between the edge devices are devoid of any of the underlying data items used to generate the incremental version of the ML model, such as the event data, thereby ensuring data security.

In an embodiment, the update module 306 is configured to update an ML model available on each of the edge devices based on the updated weights received from the real-time incremental training of the ML model at other edge devices of the peer to peer network of devices 200. During a first instance, a base version of the ML model available at the edge devices may be updated based on the updated weights and or parameters received from other edge devices. Upon subsequent receipts of the weights and/or parameters from other edge devices, the update module 306 may update the updated version of the ML model. The real-time training module 304 incrementally trains the updated ML model upon occurrence/receipt of a data event at each of the edge devices. For example, upon receiving a user selection of purchase items in an application in a mobile phone of a user, the edge device incrementally trains the updated ML model based on the data associated with user selection.

Figure 3B:
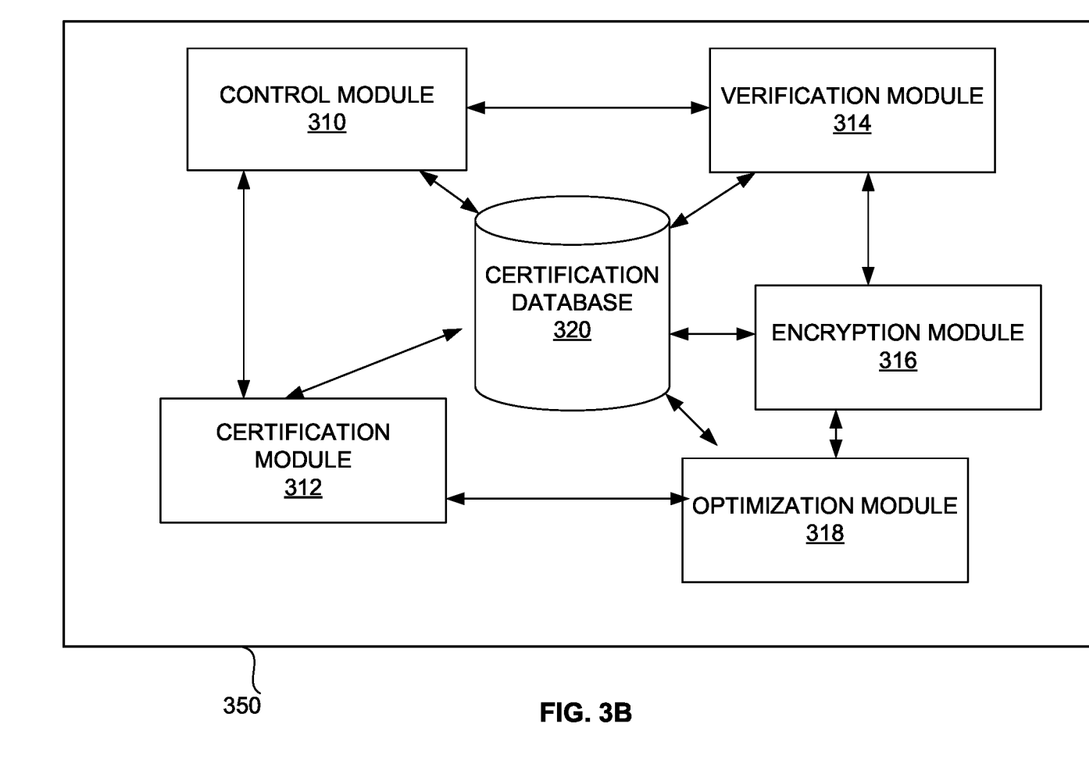
FIG. 3B illustrates a block diagram of a certification and training unit associated with the certifying node of the peer to peer network of devices, for enabling incremental training of ML models at the edge devices, in accordance with another embodiment.

FIG. 3B illustrates a block diagram of certification and training unit 350 associated with a certifying node described along with FIG. 2B, for enabling incremental training of ML models at the edge devices, in accordance with another embodiment. The certification and training unit 350 includes a control module 310, a certification module 312, verification module 314, an encryption module 316, and an optimization module 318 associatively coupled to an admin database 320. In an embodiment, the control module 310 imposes a limit on the proportion of an incremental training imparted on the ML model cumulatively contributed by each edge device so that the one or more edge devices of the peer to peer network of devices 200 are prevented from levying unduly excessive influence by providing updates to the ML model using an abnormally high number of data points. The limit imposed also enables prevention of denial of service (DOS) attacks or any such attempt by any one edge device to flood the peer to peer network with its requests, or submissions of new version of the ML models The verification module 314 ensures that semantics of incremental ML model updates only once and that each data item is used exactly once to update the ML model, so that each data item contributes exactly once to a version of the ML model that is certified by the certifying node 222. In an embodiment, each data item is used only once to avoid undue influence on the network. This ensures that the incremental update of the ML model resulting from a data item is not overridden by another incremental update of the ML model. The verification module 314 verifies "exactly once" semantics using a unique encrypted signature that each data item is provided with. Once used, the same signature is not re-used again to update a certified version of the ML model The certification module 312 provides an encrypted key to each edge device that is subsequently used to authenticate any subsequent requests/updates from the edge devices at the certifying node 222. This ensures prevention of unauthorized edge devices from joining the network, and contribute ML models to be used by all the member nodes of the network.

The encryption module 316 encrypts a format of the ML model used to transmit the incrementally updated version of the ML model from an edge device to the rest of the edge devices 102A-N to enable prevention of fraud where malicious actors from injecting unauthorized versions of the ML model into the peer to peer network of devices 200. The encryption provides an authentication to confirm that a version of the ML model originated from a legitimate edge device in the peer to peer network of devices 200.

In an embodiment, the certification module 312 is operable to receive an update to the ML model from one or more edge devices 102A-N to certify. The certification module 312 certifies a version of the updated ML model received and distributes the certified version of the updated ML model to one or more edge devices 102A-N. Subsequent to the certification, the certifying node 222 accepts only the ML models for certification based on the previously certified version of the ML models so as to ensure that none edge devices 102A-N may over-write previously certified versions of the ML model created by other edge devices 102A-N. In an embodiment, the certification module 312 uses an encrypted data to verify a base version of the ML model version from which any received updated version of the ML model was derived. In an embodiment, one or more edge devices use the updated certified versions of the ML model to re-apply their incremental training in addition and resubmit the retrained versions to the certifying node 222 for certification.

For instance, if suppose an edge device $E_i$ had previously incrementally trained an ML model version on one or more locally available data points $D_{i1}$, $D_{i2}$, upto $D_{in}$, and had submitted an incremental model version $E_i$ $V_j$ to the certifying node 222, while awaiting a response to the submission from the certifying node 222, the edge device $E_i$ receives a new certified model version, $E_k$ $V_l$ (that originated from another edge device $E_k$) from the certifying node 222. The edge device $E_i$ retrains on top of the newly received version ML model, and re-applies data points $D_{i1}$, $D_{i2}$, upto $D_{in}$ to generate a new incremental version of the ML model $E_i$ $V_{j+1}$ to send to the certifying node 222 for certification.

The certification module 312 benchmarks each such update received, in order to make sure that the predictions associated with ML model based on the event data available to the certifying node 22 match with one or more previously known metrics and that the predictions are within an acceptable margin of error. Moreover, certification module 312 also measures each incremental model update against a figure of merit such as for example, a root mean square error (RMSE). In an embodiment, the figure of merit must monotonically improve, or remain constant, in order for an update of ML model to be certified by the certifying node 222. In an embodiment, the optimization module 318 is operable to optimize a payload to include only parameters whose weights change above a certain configurable threshold percentage enabling transmission of such partial ML model contents without adversely affecting a model accuracy and consistency required for intricate engineering. Based on a file size of the ML model and the frequency of incremental updates applied on the ML model, the incremental training unit 300 enables the network 106 to automatically tune a frequency of updates to once every n data points per edge device, where n is whole number, so as to preserve a maximum upper limit (for example, total mega bite transmitted across the network per hour) on the total network traffic volume per unit time. In an embodiment, the maximum upper limit may be set by a network owner.

Although the present embodiments have been described with reference to specific example embodiments, it will be evident that various modifications and changes may be made to these embodiments without departing from the broader spirit and scope of the various embodiments, for example, the various modules, such as the real-time training module 304, the data extraction module 302, update module 306, package module 308, control module 310, verification module 314, encryption module 316, certification module 312, and optimization module 318 described herein may be enabled and operated using a firmware, software and/or hardware circuitry (e.g., CMOS based logic circuitry) or any combination of hardware, firmware, and/or software (e.g., embodied in a machine readable medium). Also, various network devices, units and methods disclosed herein may be embodied using transistors, logic gates, and electrical circuits (e.g., Application Specific Integrated (ASIC) Circuitry and/or in Digital Signal Processor (DSP) circuitry). Also, various modules described herein and their associated functionalities may be distributed across network devices belonging to different communication networks.

The software may be transmitted and/or received over a network via or through the network interface unit. The term "machine-readable medium" may be construed to include a single medium and/or multiple media (e.g., a centralized and/or distributed data-base, and/or associated caches and servers) that store the one or more sets of instructions. Moreover, the term "machine-readable medium" may be construed to include any medium that is capable of storing, encoding and/or carrying a set of instructions that may be executed by a network device such that the execution of these instructions causes the network device to perform one or more of the methodologies of the various embodiments. Furthermore, the term "machine-readable medium" may be construed to include, but shall not be limited to, solid-state memories, optical and magnetic media, and carrier wave signals.

Figure 4A:
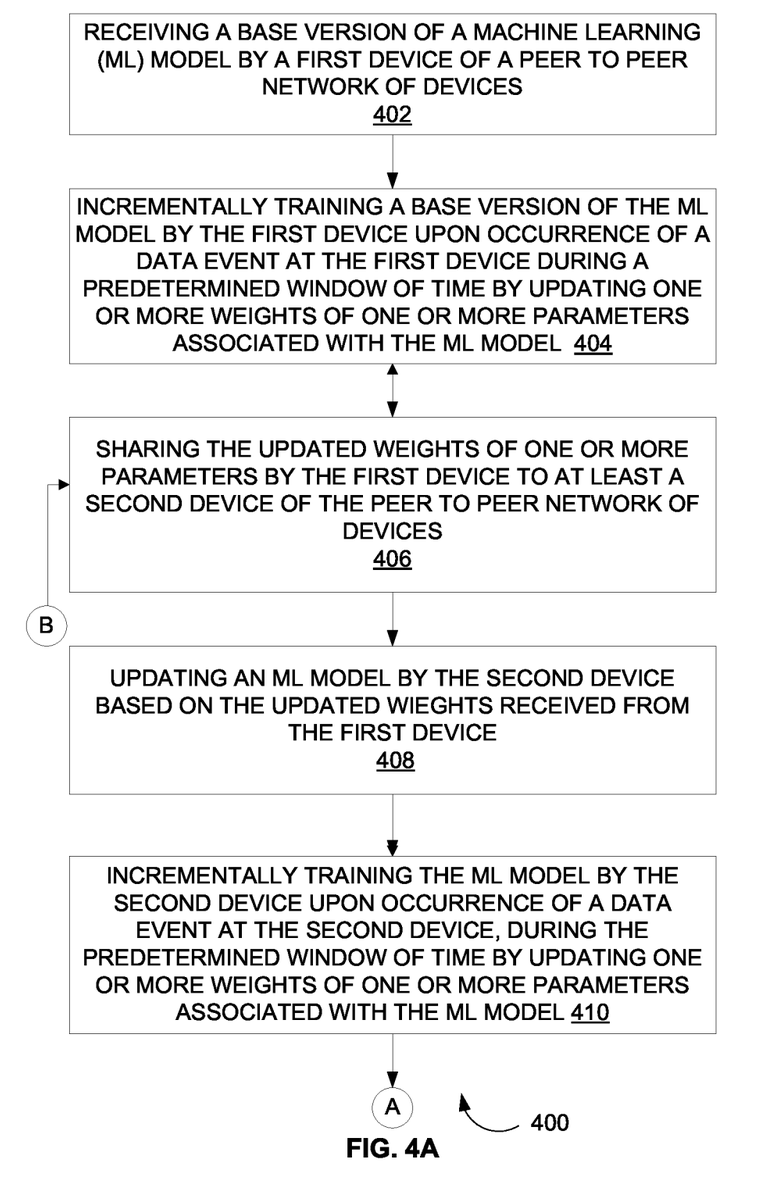
FIGS. 4A-4B depict a flow chart illustrating a method of incremental training of one or more ML models on one or more edge devices in a peer to peer network of devices, in accordance with an embodiment.
Figure 4B:
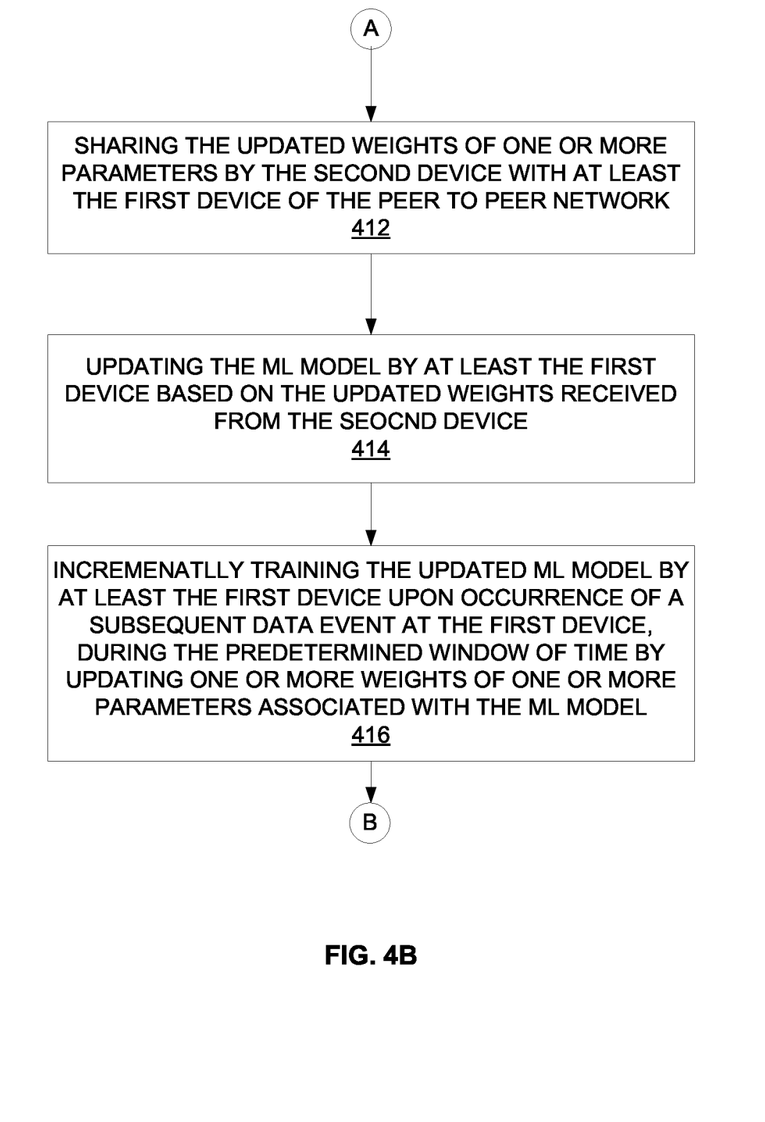

FIGS. 4A-4B illustrate is a process flow diagram depicting a method 400 of incremental training of one or more machine learning models on one or more edge devices in a peer to peer network of edge devices, according to an embodiment herein. In an example, the method 400 may be performed by an incremental training unit 300 as described herein with reference to FIG. 3. In operation 402, a base version of a machine learning model (ML model) is received by a first device of the peer to peer network of edge devices, such as for example, edge devices 102A-N. In an embodiment, the ML model may include one or more parameters and one or more weights associated with the parameters. Examples of the parameters may include, but is not limited to gender, age, location, the category of the content on the website/app, and the like. The weights indicate an amount of importance the respective parameters are given in the decisions made by the ML model. For example, gender may have a weight of 0.4, while age may have a weight of 0.3. In operation 404, a base version of the ML model is incrementally trained by a first device from among the peer to peer network of devices upon occurrence of a data event at the first device. The incremental training is performed by updating one or more weights associated with the one or more parameters of the ML model during a predetermined window of time. The predetermined window of time may include, for example, one individual event or a short batch of events. In an embodiment, the predetermined window of time may be configurable. In an embodiment, the updates are applied in real-time on receipt of an event data. The ML model comprises learnings based on data previously seen by other edge nodes in the network environment. In an embodiment, the learnings are devoid of an underlying event data used to generate the incremental version of the ML model. During the incremental training process described herein, a previous version of the ML model may be used as a baseline, or if no such previous version of the ML model is available, then a base version of the ML model may be generated and/or used. To train an ML model incrementally on an edge device, the edge device may have received an ML model comprising net learnings based on data previously seen by other edge devices in the peer-peer network, but without their underlying event data and such an ML model may constitute the previous, or base version of the ML model on which edge device incrementally applies one or more training updates.

In operation 406, the updated weights associated with parameters of the incrementally trained ML model and/the respective parameters are shared by the first device to at least a second device of the peer to peer network of devices. In an embodiment, each edge device registered with the peer to peer network of devices may share the updated weights and/or the parameters of the incrementally trained ML model with all the other edge devices in the peer to peer network of devices. In an embodiment, the weights and/or the parameters shared between the edge devices are devoid of any of the underlying data items used to generate the incremental version of the ML model, such as the event data. In an embodiment, the weights and/or the parameters shared between the edge devices may be encrypted, to protect and against fraud where malicious actors can inject unauthorized model versions into the network. The encryption provides authentication that the model version originated from a legitimate data node in the network In operation 408, the second device updates an ML model available to the second device based on the updated weights received from the first device. During a first instance the second device may update a base version of the ML model available at the second device based on the updated weights. Upon subsequent receipts of the weights and/or parameters from other edge devices, the second device may update the updated version of the ML model. In an embodiment, the semantics of incremental ML model updates only once. In an embodiment, each data item is used exactly once to update the ML model, so that each data item contributes exactly once to a version of the ML model that is certified by the certifying node. In an embodiment, each data item is used only once to avoid undue influence on the network. This ensures that the incremental update of the ML model resulting from a data item is not overridden by another incremental update of the ML model. The single semantics is verified using a unique encrypted signature that each data item is provided with. Once used, the same signature is not re-used again to update a certified version of the ML model.

In operation 410, the second device incrementally trains the updated ML model upon occurrence/receipt of a data event at the second device. For example, upon receiving a user selection of purchase items in an application in a mobile phone of a user, the edge device incrementally trains the updated ML model based on the data associated with user selection.

In an embodiment, a limit is imposed on the proportion of an incremental training imparted on the ML model cumulatively contributed by each edge device so that the one or more edge devices of the peer to peer network are prevented from levying unduly excessive influence by providing updates to the ML model using an abnormally high number of data points. The limit imposed also enables prevention of denial of service (DOS) attacks or any such attempt by any one edge device to flood the peer to peer network with its requests, or submissions of new version of the ML models.

In operation 412, the second device shares the updated weights of one or more parameters with at least the first device of the peer to peer network of devices. In an embodiment, the updated weights may be shared with all the edge devices associated with the peer to peer network of devices. In operation 414, at least the first device from among the edge devices of the peer to peer network of devices updates the ML model based on the updated weights received from the second device. In operation 416, at least the first device incrementally trains the updated ML model upon occurrence of a subsequent data event at the first device during the predetermined window of time. The incremental training is performed by updating one or more weights of one or more parameters associated with the ML model. Subsequently, operations 406 to 416 repeat to incrementally train ML models at the edge devices of the peer to peer network in real-time upon occurrence of a data event at each of the edge devices.

Various embodiments herein enable preservation of user data privacy as the user data stays with the edge device (e.g. user device) and does not get aggregated on any server, thereby eliminating risk of data leaks caused by hacks of a central server. For example, sensitive health signals that are available to an application on a wearable device such as a smart watch may now be used to predict a probability of the user getting a disease, without concerns about sending such sensitive data to a server. Various embodiments enable real-time machine learning to happen in real-time, as soon as a data event occurs on the edge device, thereby improving the quality of the decisions made by the ML model.

In another example, to overcome COVID-19, and other global health challenges, instead of aggregating all user data on a server (i.e. instead of sending the user data to the server having the ML model), the user data stays with the edge device and the ML model of other edge devices in the peer to peer network is shared with the edge device to incrementally train it. This makes life-and-death decisions on which patients to prioritize, and what treatments they should get. The ML model is shared with each edge device, and learns from their data. Each edge device shares those learnings (not the raw user data), with the other edge devices in the peer to peer network, and brings together the learnings from all the edge devices. The process and system disclosed herein deliver high quality personalization as those legacy centralized systems in real-time, so the system can leverage the latest trends, without waiting for a nightly or weekly model training run.

In an example embodiment, the process and system disclosed herein enable the edge devices to learn from data events throughout their lifecycle. Further, the process and system disclosed herein enables pools learnings from all edge devices in the peer to peer network, without the need to pool their raw data on a server and shares the learnings between the edge devices, not user data or raw data. The process and system disclosed herein uses learnings across the edge devices to predict the lifetime value (LTV) of a new edge device early (i.e. as early as a first-time experience), and with high precision. The edge devices feed learning data back to tune and optimize their campaigns in a timely manner, in order to reach the target LTV expeditiously. For example, even when preserving user data privacy without concerns about sending such sensitive data to a server by moving ML model training and inferencing to the edge device, the edge device may still learn, without needing to aggregate user data on a server, with or without user or device ID's.

The process and system disclosed herein provides peer-to-peer machine learning platform that can provide real time ML based decisions, while preserving the security of user sensitive data. The ML technology performs both model training and decisioning in real time, entirely on the edge device, in a federated manner, thereby eliminating the need for aggregating user/edge device data centrally for building ML models. Thus, the user data remain confidential data in the edge device and never need to leave a firewall of the edge device. The learnings from the user data can be combined with similar learnings of other edge devices in peer to peer network, in order to improve patients' diagnoses.

Figure 5:
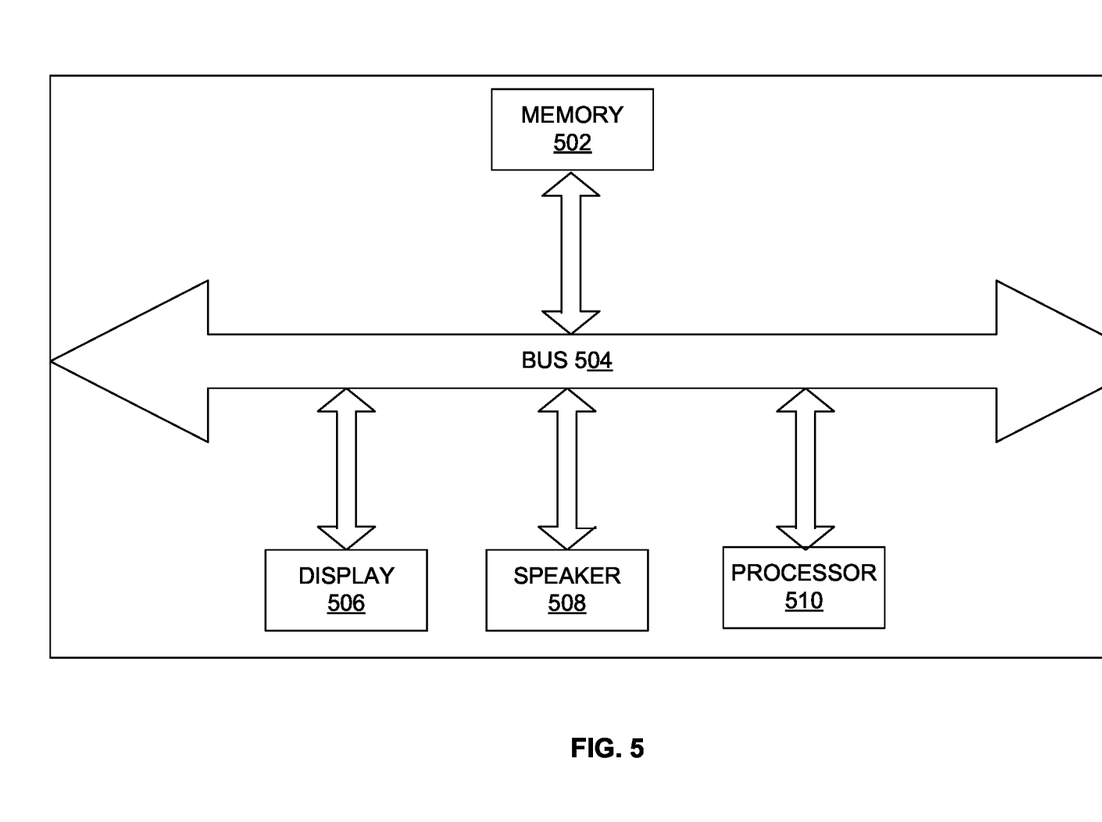
FIG. 5 illustrates an exploded view of an edge device configured to perform any one or more of the methodologies herein, in accordance with an embodiment.

FIG. 5 illustrates an exploded view of an edge device having a memory 502 storing a set of computer instructions, a bus 504, a video display unit 506, an audio output unit 508, an input unit 509, and a processor 510 capable of processing a set of instructions to perform any one or more of the methodologies herein, according to an embodiment herein. The processor 510 may enable digital content to be consumed in the form of video for output via the video display unit 506 or audio for output via the audio output unit 508. An example of the audio output unit 508 may include a speaker. An example of the input unit 509 may include, but is not limited to a microphone, a keyboard, a haptic input device, a camera, and the like. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g., the detected information bits) available in the future or stored from the past. A user (for example a user 108A, of edge device 102A) may view the stored information on the display 406 and select an item of for viewing, listening, or other uses via input, which may take the form of keypad, scroll, or other input device(s) or combinations thereof. When digital content is selected, the processor 510 may pass information. The content and PSI/SI may be passed among functions within the user/edge devices using the bus 504.

In various embodiment, the process and system of incremental training of ML models as described herein provide several advantages over the prior art techniques. For instance, the process and system disclosed herein enable preservation of user data privacy is preserved as the data associated with the users never leaves the respective edge devices and is not aggregated on any server. Also, risk of data leaks caused by hacks of the central server is eliminated, as there is no central server to hack. The full power of all the data can now be used to benefit users. For example, sensitive health signals that are available to an application on a wearable device such as a smart watch can now be used to predict a user's probability of getting a disease, without concerns about sending such sensitive data to a server. The incremental training of the ML models enables the machine learning process to happen in real-time, as soon as the data event occurs on the edge devices thereby improving the quality of the decisions made by the ML model.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, Subscriber Identity Module (SIM) card, and cache memories which provide temporary storage of at least some program code in order to reduce the number of times code must be retrieved from bulk storage during execution. Input/output (I/O) devices (including but not limited to keyboards, displays, pointing devices, remote controls, camera, microphone, temperature sensor, accelerometer, gyroscope, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within their spirit and scope.

What is claimed is:

1. A system comprising a first edge device that performs an incremental training of one or more machine learning (ML) models, wherein the first edge device is communicatively connected to other edge devices in a peer to peer network, the first edge device comprising:
    a processor that is configured to
        (a) implement a base version of a first machine learning (ML) model in the first edge device, wherein the first ML model comprises one or more first parameters and one or more first weights associated with the one or more first parameters;
        (b) incrementally train the base version of the first ML model upon occurrence of a first data event, by updating the one or more first weights of the first ML model during a first predetermined window of time;
        (c) incrementally train a second ML model associated with the second edge device by communicating the one or more first updated weights to the second edge device by enabling a second edge device, in the peer to peer network, wherein the second edge device updates the second ML model based on the one or more first updated weights and incrementally trains the updated second ML model, upon occurrence of a second data event at the second edge device, by updating one or more second weights associated with one or more second parameters of the second ML model during the first predetermined window of time;

(d) update the first ML model based on the one or more second updated weights received from the second edge device to obtain an updated version of the first ML model; and (e) incrementally train the updated version of the first ML model, upon occurrence of a subsequent data event, by updating the one or more first weights of the updated version of the first ML model during the first predetermined window of time; and a certifying node that is communicatively connected with the first edge device to regulate the incremental training of the first ML model, wherein the first edge device is configured to register with the certifying node while joining the peer to peer network, wherein the certifying node provides an encrypted key to the first edge device that is used to authenticate any subsequent updates from the first edge device, wherein the first edge device performs the incremental training on the updated versions of the first ML model that is certified and resubmits a subsequent version of the first ML model to the certifying node for certification.

2. The system as claimed in claim 1, wherein the processor is configured to perform the steps (c) to (e) repeatedly to incrementally train the first ML model.

3. The system as claimed in claim 1, wherein the processor is configured to provide the updated version of the first ML model to the certifying node and the certifying node is configured to certify the updated version of the first ML model.

4. The system as claimed in claim 1, wherein the certifying node is configured to benchmark the updated version of the first ML model by matching predictions of the updated version of the first ML model based on the first data event with one or more previously known data event.

5. The system as claimed in claim 1, wherein the first edge device is configured to generate the base version of the first ML model using an authorized program.

6. The system as claimed in claim 1, wherein the one or more first parameters or the one or more second parameters comprises at least one of a gender, an age, a location, a category of a content on a website or an application, and wherein the one or more first weights or the one or more second weights indicates an amount of importance their respective parameters that are given in the decisions made by the ML model.

7. The system as claimed in claim 1, wherein each of the first, the second or the subsequent data event comprises data associated with a user input to a particular application, wherein the user input comprises a usage of the particular application by a user.

8. The system as claimed in claim 1, wherein the first predetermined window of time is configurable and comprises one individual event or a short batch of events.

9. The system as claimed in claim 1, wherein the base version of the first machine learning (ML) model in the first edge device is a previous version of the first machine learning (ML) model, wherein the first edge device generates the base version of the first machine learning (ML) model if no previous version of the ML model is available.

10. The system as claimed in claim 1, wherein the first edge device is configured to subsequently share the updated version of the first ML model along with the one or more updated first weights and one or more updated first parameters with other edge devices in the peer to peer network.

11. A method of performing an incremental training of one or more machine learning (ML) models on a first edge device in real time, wherein the first edge device is communicatively connected to other edge devices in a peer to peer network, the method comprising:

(a) implementing a base version of a first machine learning (ML) model in the first edge device, wherein the first ML model comprises one or more first parameters and one or more first weights associated with the one or more first parameters, wherein the base version of the first ML model comprises learnings based on data previously seen by other edge devices in the peer to peer network, wherein the learnings are devoid of an underlying data event used to generate an incrementally trained version of the ML model;

(b) incrementally training the base version of the first ML model, upon occurrence of a first data event, by updating the one or more first weights of the first ML model during a first predetermined window of time;

(c) incrementally training a second ML model associated with the second edge device by communicating the one or more first updated weights to the second edge device by enabling a second edge device, in the peer to peer network, wherein the second edge device updates the second ML model based on the one or more first updated weights and incrementally trains the updated second ML model, upon occurrence of a second data event at the second edge device, by updating one or more second weights associated with one or more second parameters of the second ML model during the first predetermined window of time;

(d) updating the first ML model based on the one or more second updated weights received from the second edge device to obtain an updated version of the first ML model;

(e) incrementally training the updated version of the first ML model, upon occurrence of a subsequent data event, by updating the one or more first weights of the updated version of the first ML model during the first predetermined window of time; and (f) regulating, using a certifying node that is communicatively connected with the first edge device, the incremental training of the first ML model, wherein the first edge device is configured to register with the certifying node while joining the peer to peer network.

12. The method as claimed in claim 11, wherein the method performs the steps of (c) to (e) repeatedly to incrementally train the first ML model.

13. One or more non-transitory computer readable storage mediums storing instructions, which when executed by a processor, causes to perform a method of an incremental training of one or more machine learning (ML) models on a first edge device, wherein the first edge device is communicatively connected to other edge devices in a peer to peer network, the method performs the steps of:

(a) implementing a base version of a first machine learning (ML) model in the first edge device, wherein the first ML model comprises one or more first parameters and one or more first weights associated with the one or more first parameters;

(b) incrementally training the base version of the first ML model in, upon occurrence of a first data event, by updating the one or more first weights of the first ML model during a first predetermined window of time;

(c) incrementally training a second ML model associated with the second edge device by communicating the one or more first updated weights to the second edge device by enabling a second edge device, in the peer to peer network, wherein the second edge device updates the second ML model based on the one or more first updated weights and incrementally trains the updated second ML model, upon occurrence of a second data event at the second edge device, by updating one or more second weights associated with one or more second parameters of the second ML model during the first predetermined window of time;

(d) updating the first ML model based on the one or more second updated weights received from the second edge device to obtain an updated version of the first ML model;

(e) incrementally training the updated version of the first ML model, upon occurrence of a subsequent data event, by updating the one or more first weights of the updated version of the first ML model during the first predetermined window of time; and (f) regulating, using a certifying node that is communicatively connected with the first edge device, the incremental training of the first ML model, wherein the first edge device is configured to register with the certifying node while joining the peer to peer network, wherein the certifying node provides an encrypted key to the first edge device that is used to authenticate any subsequent updates from the first edge device, wherein the first edge device performs the incremental training on the updated versions of the first ML model that is certified and resubmits a subsequent version of the first ML model to the certifying node for certification.

14. The one or more non-transitory computer readable storage mediums storing instructions of claim 13, which when executed by the processor, further causes the method to perform the steps of (c) to (e) repeatedly to incrementally train the first ML model.

15. The one or more non-transitory computer readable storage mediums storing instructions of claim 13, which when executed by the processor, further causes the method to perform the step of providing an encrypted key to the first edge device that is used to authenticate any subsequent updates from the first edge device.

16. The one or more non-transitory computer readable storage mediums storing instructions of claim 13, which when executed by the processor, further causes the method to perform the step benchmarking the updated version of the first ML model by matching predictions of the updated version of the first ML model based on the first data event with one or more previously known data event.

* * * * *